United States Patent [19]
Bachner et al.

[11] 3,872,598
[45] Mar. 25, 1975

[54] APPARATUS FOR MEASURING THE WALL THICKNESS OF A SOLIDIFYING CASE BODY IN CASTING HOT LIQUID METAL IN A MOULD

[75] Inventors: Ernst Bachner; Herbert Bumberger; Rudolf Hoscher, all of Linz, Austria

[73] Assignee: Vereinigte Osterreichische Eisen-und Stahlwerke-Alpine Montan Aktiengesellschaft, Linz, Austria

[22] Filed: Aug. 25, 1972

[21] Appl. No.: 283,848

[30] Foreign Application Priority Data
Sept. 14, 1971 Austria .............................. 7958/71

[52] U.S. Cl. ............ 33/169 R, 33/172 B, 33/174 R, 164/4
[51] Int. Cl. ..................... G01b 5/06, B22c 19/00
[58] Field of Search .......... 33/169 R, 169 C, 172 R, 33/174 R, 174 J, 172 B; 75/176, 177; 164/4, 155, 165; 73/61.2; 23/253 C; 65/29

[56] References Cited
UNITED STATES PATENTS
1,660,616   2/1928   James .............................. 33/169 R
2,095,059   10/1937  Donnelly ........................... 33/169 R
2,312,216   2/1943   Keeler .............................. 33/148 R
2,980,973   4/1961   Knapp et al. ...................... 164/4
3,456,715   7/1969   Freedman et al. ................. 164/4

FOREIGN PATENTS OR APPLICATIONS
23,973   11/1898   United Kingdom ............... 33/169 R Primary Examiner—Harry N. Haroian
Assistant Examiner—Richard R. Stearns
Attorney, Agent, or Firm—Brumbaugh, Graves, Donohue & Raymond

[57] ABSTRACT

The invention relates to an apparatus for measuring the wall thickness of a solidifying cast body in casting hot liquid metal in a mould. The apparatus comprises a rod-shaped sensor which is movably arranged above the mould in a manner that it may be introduced into said mould and adjusted to touch a wall of the solidifying cast body, and on said sensor a means for indicating the adjustment path which is proportional to the wall thickness.

4 Claims, 2 Drawing Figures

FIG. I

APPARATUS FOR MEASURING THE WALL THICKNESS OF A SOLIDIFYING CASE BODY IN CASTING HOT LIQUID METAL IN A MOULD

The invention relates to an apparatus for measuring the wall thickness of a solidifying cast body in casting hot liquid metal in a mould, in particular for measuring the thickness of a bar shell in continuous casting of steel bars.

In casting hot liquid metals into moulds, in particular in continuous casting of steel bars, it is desirable to be able to measure the thickness of the already solidified wall of the cast body or of the bar shell, in order to regulate the casting speed or the speed with which the bar is drawn out of the mould. The thickness of the bar shell is a measure for the solidifying speed of the metal in the mould.

So far two methods for determining the wall thickness of solidifying cast blocks or cast bars have become known, in which methods ultra sound or radioactive isotopes are used. When ultrasound is used it is difficult to join the sound donor to the cast bar shell, becuase there is little space below the mould and there is the danger that the steel might break through. Also such apparatus is sensitive against the influence of heat and steam so that its servicing is rather difficult. When the wall thickness is to be measured by means of radioactive isotopes, e.g., by adding during casting radioactive phosphorus or sulfur, continuously cast slabs are cut through and photographed. Such measuring may take place only when casting is terminated but cannot be applied for continuously establishing the wall thickness of a bar shell.

The invention is aimed at avoiding these disadvantages and difficulties and in an apparatus of the kind defined in the introduction resides in that a sensor resistant against the hot liquid metal and preferably designed to be rod- or tube-shaped, is movably arranged above the mould in a manner that it may be introduced from above into the mould space and adjusted to touch from the interior at least one wall of the solidifying cast body, the sensor being provided with a means for indicating the adjustment path which is proportional to the wall thickness.

According to a further feature of the invention the sensor at least in the area where it is in contact with the hot liquid metal is made of sintered metal comprising 40 to 80 % by volume of metallic molybdenum, remainder zirconium oxide. Sintered metals of molybdenum and zirconium oxide are not corroded by liquid metals up to 1,700°C; they are particularly resistant against liquid steel melts. Such materials are highly resistant against changes in temperature and highly stable at high temperatures. They are workable by detaching cuttings, highly resistant against liquid slag and are practically not wetted by liquid metals.

Preferably the rod- or tube-shaped sensor is movable in direction of its longitudinal axis. It may also be rotatable in a bearing around a horizontal axis and slewable around an axis vertical to its longitudinal axis and to the horizontal axis.

In order that the invention may be more fully understood, an embodiment thereof shall now be described with reference to the accompanying drawings, illustrating an apparatus for measuring the thickness of the bar shell in continuous casting of steel bars.

Figure 1:
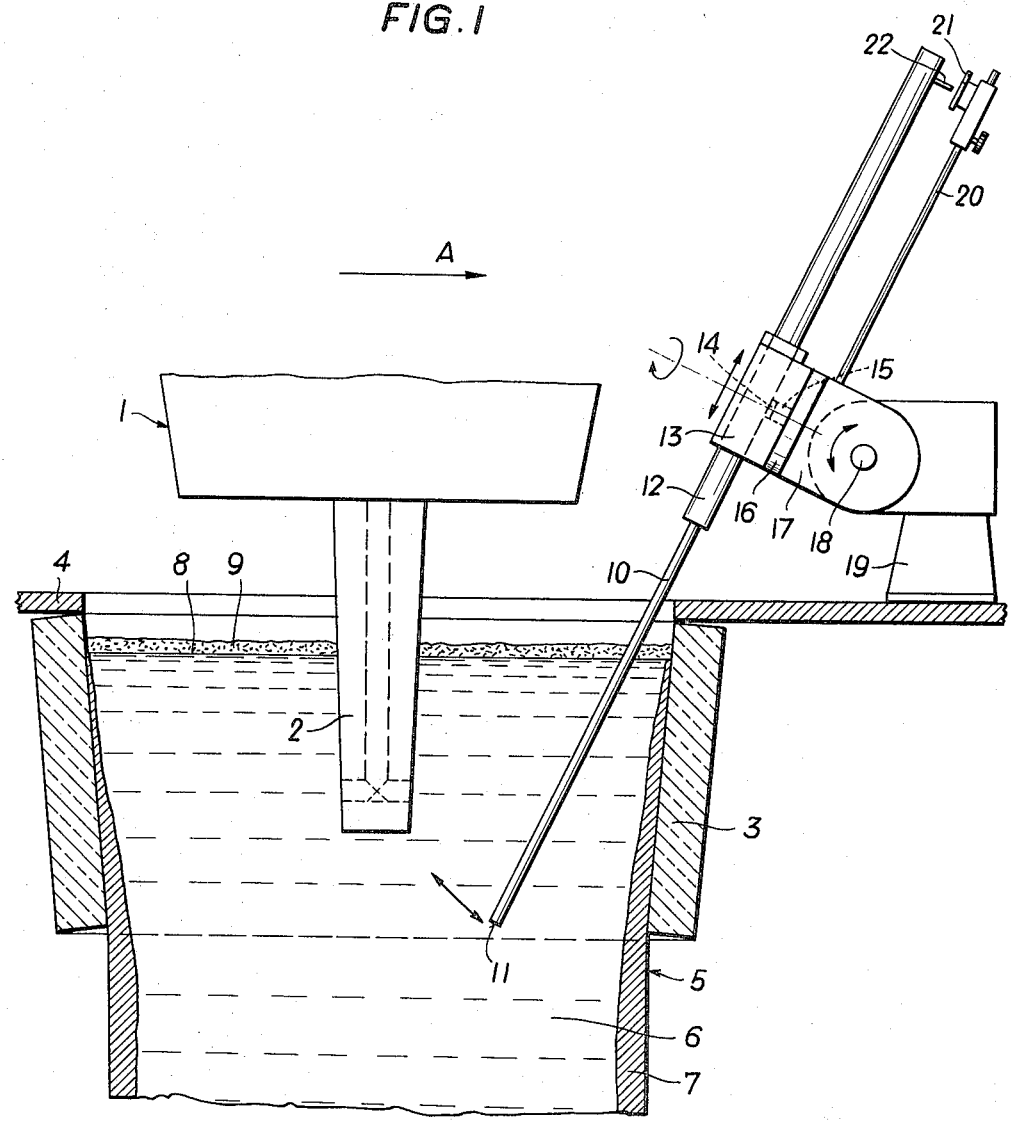
FIG. 1 is a lateral view of the apparatus, the mould and the cast body being illustrated in a sectional view.
Figure 2:
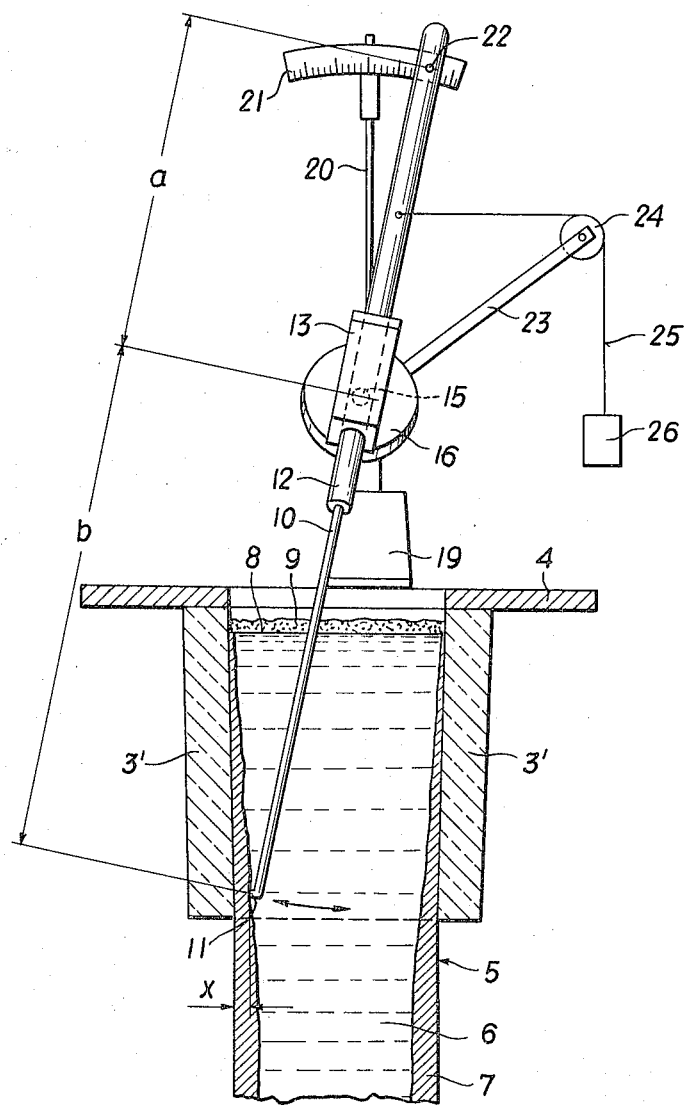
FIG. 2 is a front view in direction A of FIG. 1, the mould and the cast body again being illustrated in a sectional view.

Numeral 1 denotes a refractory-lined tundish to which a casting tube 2 is attached through which the steel flows into the water-cooled mould, the walls of which are denoted with 3 (FIG. 1) and with 3' (FIG. 2). Above the mould a cover plate 4 is provided. The bar 5 having a liquid core 6 and a solidified bar shell 7 is continuously drawn out of the mould and cooled. The casting level 8 is protected by a casting powder 9 against the influence of the atmosphere and against heat dissipation.

The apparatus according to the invention for measuring the thickness of the bar shell 7 comprises a rod-shaped sensor 10 made of sintered material comprising 60 % by volume of metallic molybdenum, remainder zirconium oxide. The sensor may be introduced into the mould hollow space and adjusted to touch with its tip 11 the mould wall or the inner side of the bar shell 7. For this purpose the sensor rod 10 is mounted in a holding tube 12, which in its part in direction of the double arrow is axially displaceable in a holding means 13. The holding means 13 is provided with a bore 14, in which a pin 15 of a plate 16 engages; the sensor 10 and the tube 12 thus may be slewn around the pin 15. The plate 16 is mounted at a carrier 17. The carrier 17 is mounted in a bearing 19 on the cover plate 4 to be rotatable around a horizontal axis 18. On the carrier 17 furthermore a rod 20 is attached with at its top end carries a scale 21. In the area of this scale an indicator 22 is arranged on the tube 12 and indicates the slewing path of the sensor 10 around the pin 15. Preferably the scale 21 is axially displaceable so that its position may be adjusted by hand in direction of the axis of the rod 20, when the rod 12 is displaced in the holding means 13. On the tube 12 a rope 25 may be attached, which is guided over a roller 24 mounted on an arm 23 and carries a weight 26 so that the sensor 10 is continuously pressed onto the bar shell 7 (FIG. 2).

How the apparatus functions will be described in the following: Before casting is started, the sensor 10 is adjusted to touch the inner side 3' of the mould and the zero value or starting value is indicated on the scale 21 by the indicator 22. After onset of casting, i.e., when a bar shell 7 starts to form around the liquid core 6, the sensor 10 is adjusted at the same measuring place in a manner that its tip 11 touches the bar shell 7 from the inside. The value indicated on the scale 21 by the indicator 22 is proportional to the thickness $x$ of the bar shell; the ratio of the distance $a$ between indicator 22 and rotation axis 15 to the distance $b$ between rod tip 11 and rotation axis 15 has to be considered in the calculation. If the distance $a$ is equal to the distance $b$, the indicator deflection is equal to the distance $x$; otherwise the value read from the scale has to be multiplied by the ratio $b:a$ in order to obtain $x$. The fact that the sensor carries out a circular slewing movement may likewise be considered in the calculation, but the difference between the arc section and the vertical distance between bar shell and mould wall may be neglected in practice.

With the described apparatus it is possible in a simple manner to measure continuously the wall thickness of the bar shell at any desired place. It is also possible to "scan" the total bar shell during casting. The bearing 19 may, in addition, be displaceable on the cover plate 4 in horizontal direction, parallel to the mould walls.

What we claim is:

1. An apparatus for measuring the wall thickness of a solidifying cast shell formed in casting hot liquid metal into a mould, comprising
    a heat resistant sensor rod having a melting point higher than the melting point of steel and being substantially unwetted by liquid metals,
    holding means for pivotally holding said sensor rod above the mould in such a manner that it may be introduced into the mould from above and adjusted so that one end touches at least one inner wall of the solidifying cast shell,
    means for indicating the change in pivotal displacement of said one end of said sensor rod as the shell is formed, and
    means for maintaining said sensor rod in continuous contact with the one wall of the shell so that the thickness of the shell is continuously measured during continuous casting of a bar shell.

2. An apparatus for measuring the wall thickness of a solidifying cast shell formed in casting hot liquid metal into a mould, comprising
    a heat resistant sensor rod having a portion thereof in contact with the hot liquid metal, the portion in contact with the hot liquid metal having a melting point higher than the melting point of steel and comprising 40–80% by volume of metallic molybdenum, remainder zirconium oxide,
    holding means for pivotally holding said sensor rod above the mould in such a manner that it may be introduced into the mould from above and adjusted so that one end touches at least one inner wall of the solidifying cast shell, and
    means for indicating the change in pivotal displacement of said one end of said sensor rod as the shell is formed to determine the thickness of the shell.

3. An apparatus for measuring the wall thickness of a solidifying cast shell formed in casting hot liquid metal into a mould, comprising
    a heat resistant sensor rod having a melting point higher than the melting point of steel,
    holding means for pivotally holding said sensor rod above the mould in such a manner that it may be introduced into the mould from above and adjusted so that one end touches at least one inner wall of the solidifying cast shell, said holding means includes means mounting said sensor rod for axial movement relative to said holding means, and
    means for indicating the change in pivotal displacement of said one end of said sensor rod as the shell is formed to determine the thickness of the shell.

4. An apparatus for measuring the wall thickness of a solidifying cast shell formed in casting hot liquid metal into a mould, comprising:
    a heat resistant sensor rod having a melting point higher than the melting point of steel,
    holding means for pivotally holding said sensor rod above the mould in such a manner that it may be introduced into the mould from above and adjusted so that one end touches at least one inner wall of the solidifying cast shell, said holding means comprising a retaining means for pivotally holding said sensor rod at a point along its length so that it may be rotated about an axis passing through said point to touch the inner wall of the cast shell, said pivotal retaining means mounting said sensor rod for axial displacement to change the point along the length of the rod at which it is held, a frame fastened above the mould, and a bearing means for rotatably connecting said pivotal retaining means to said frame above the mould, said bearing means allowing rotation of said pivotal retaining means about a horizontal axis perpendicular to axis of the pivotal motion of said rod, and
    means for indicating the change in pivotal displacement of said one end of said sensor rod as the shell is formed to determined the thickness of the shell.

* * * * *

UNITED STATES PATENT OFFICE
CERTIFICATE OF CORRECTION

PATENT NO. : 3,872,598
DATED : Mar. 25, 1975
INVENTOR(S) : Bachner et al.

It is certified that error appears in the above-identified patent and that said Letters Patent are hereby corrected as shown below:

First page, Item [54], "CASE" should read --CAST--;

Col. 1, line 2, "CASE" should read --CAST--;

Col. 1, line 23, "becuase" should read --because--; and

Col. 2, line 31, "with" should read --which--.

Signed and Sealed this twenty-third Day of September 1975

[SEAL]

Attest:

RUTH C. MASON
Attesting Officer

C. MARSHALL DANN
Commissioner of Patents and Trademarks